United States Patent

Tojo et al.

[11] Patent Number: 5,470,919
[45] Date of Patent: Nov. 28, 1995

[54] CHLORINATED ETHYLENE/α-OLEFIN COPOLYMER RUBBER AND COMPOSITION CONTAINING THE SAME

[75] Inventors: Tetsuo Tojo; Muneyuki Matsumoto; Yoshiharu Kikuchi, all of Ichihara, Japan

[73] Assignee: Mitsui Petrochemical Industries, Ltd., Tokyo, Japan

[21] Appl. No.: 280,831

[22] Filed: Jul. 26, 1994

[30] Foreign Application Priority Data

Jul. 29, 1993 [JP] Japan .................... 5-187886

[51] Int. Cl.[6] .................................... C08F 8/20
[52] U.S. Cl. .................. 525/334.1; 524/576; 525/344; 525/354; 525/370; 525/379
[58] Field of Search ................ 525/334.1, 334, 525/354, 370, 379; 524/576

[56] References Cited

U.S. PATENT DOCUMENTS

| | | | |
|---|---|---|---|
| 3,856,766 | 12/1974 | Aystetten et al. | 525/334.1 |
| 3,891,725 | 6/1975 | Klever | 525/334.1 |
| 4,547,554 | 10/1985 | Kadomatsu et al. | |
| 4,959,420 | 9/1990 | Davis et al. | 525/331.7 |
| 5,015,696 | 5/1991 | Davis et al. | 525/331.7 |
| 5,045,603 | 9/1991 | Davis et al. | 525/331.7 |
| 5,087,673 | 2/1992 | Watanabe et al. | |

FOREIGN PATENT DOCUMENTS

| | | |
|---|---|---|
| 0329891 | 8/1989 | European Pat. Off. . |
| 0453262 | 10/1991 | European Pat. Off. . |
| 0487278 | 5/1992 | European Pat. Off. . |
| 2529210 | 6/1983 | France . |
| 2172289 | 9/1986 | United Kingdom . |
| WO9324539 | 9/1993 | WIPO . |

*Primary Examiner*—Bernard Lipman
*Attorney, Agent, or Firm*—Birch, Stewart, Kolasch & Birch

[57] ABSTRACT

A chlorinated ethylene/α-olefin copolymer rubber which is a chlorinated product of an ethylene/α-olefin copolymer rubber having a vinylidene bond at the terminal of the molecule, the number of said vinylidene bond being 0.05 to 1.00 per 1,000 carbon atoms, which has a chlorine content of 20 to 40% by weight, and which has a Mooney viscosity $[ML_{1+4}(121° C.)]$ of 10 to 190; and a composition comprising the chlorinated ethylene/α-olefin copolymer rubber, (a) a reinforcing agent, (b) a softening agent, and (c) a vulcanizing agent.

5 Claims, No Drawings

CHLORINATED ETHYLENE/α-OLEFIN COPOLYMER RUBBER AND COMPOSITION CONTAINING THE SAME

DETAILED DESCRIPTION OF THE INVENTION

This invention relates to a chlorinated ethylene/α-olefin copolymer rubber and a composition containing the same. More specifically, this invention relates to a chlorinated ethylene/α-olefin copolymer rubber which is excellent in rubber elasticity and which is quite useful as a sealing material that is a typical usage of a rubber product, and a composition containing the same.

Chlorinated ethylene/α-olefin copolymer rubbers are disclosed in Rubber Chem. Technol. 49 353 (1976) and Japanese Laid-open Patent Application (Kokai) Nos. 99,149/1985, 182,340/1989 and 296,506/1991, and are therefore already well known.

The chlorinated ethylene/α-olefin copolymer rubbers are excellent in ozone resistance, resistance to heat ageing, weather resistance and oil resistance, but involve a problem that they can hardly be used in a sealing material because of their low modulus.

It is an object of this invention to eliminate the above problems and to provide a chlorinated ethylene/α-olefin copolymer rubber having a high modulus in addition to properties inherent to said rubber, and a useful composition containing the same.

The other objects and advantages of this invention will be made apparent from the following explanation.

In accordance with this invention, the above objects and advantages of this invention are first achieved by a chlorinated ethylene/α-olefin copolymer rubber:

which has a chlorine content of 20 to 40% by weight, which has a Mooney viscosity [$ML_{1+4}(121°$ C.$)$] of 10 to 190, and in which an ethylene/α-olefin copolymer rubber before the chlorination has a vinylidene bond at the terminal of the molecule, the number of the vinylidene bond being 0.05 to 1.00 per 1,000 carbon atoms.

That is, the chlorinated ethylene/α-olefin copolymer rubber is a chlorinated product of an ethylene/α-olefin copolymer rubber having a vinylidene bond at the terminal of the molecule, the number of said vinylidene bond being 0.05 to 1.00 per 1,000 carbon atoms, and said rubber has a chlorine content of 20 to 40% by weight, and has the Mooney viscosity [$ML_{1+4}(121°$ C.$)$] of 10 to 190.

In the chlorinated ethylene/α-olefin copolymer rubber, the composition molar ratio of the ethylene unit and the α-olefin unit of the ethylene/α-olefin copolymer rubber before the chlorination is preferably 85/15 to 95/5.

In accordance with this invention, there is second provided a composition comprising 100 parts by weight of the chlorinated ethylene/α-olefin copolymer rubber of this invention, (a) up to 300 parts by weight of a reinforcing agent, (b) up to 200 parts by weight of a softening agent, and (c) $5.0\times10^{-4}$ to $5.0\times10^{-2}$ mol, per 100 g of said copolymer rubber, of a vulcanizing agent.

An ethylene/α-olefin copolymer rubber (base polymer) used in the chlorinated ethylene/α-olefin copolymer rubber of this invention, a process for producing the chlorinated ethylene/α-olefin copolymer rubber of this invention from this base polymer, properties of the rubber, and the vulcanized rubber composition will be hereinafter explained in sequence.

The ethylene/α-olefin copolymer rubber used as the base polymer in the chlorinated ethylene/α-olefin copolymer rubber of this invention is as follows. For example, an α-olefin having 3 to 20 carbon atoms is preferably used. Examples of such α-olefin include propylene, 1-butene, 4-methylpentene-1, hexene, octene, decene and dodecene. Preferable are 1-butene and 1-hexene.

The composition molar ratio of the ethylene unit and the α-olefin unit (ethylene/α-olefin) in the ethylene/α-olefin copolymer rubber is preferably 85/15 to 95/5, more preferably 88/12 to 93/7.

The ethylene/α-olefin copolymer rubber has the vinylidene bond at the terminal of the molecule. The number of the vinylidene bond is 0.05 to 1.00, preferably 0.10 to 0.70, per 1,000 carbon atoms. The number of the vinylidene bond is quite important to achieve the object of this invention.

Such ethylene/α-olefin copolymer rubber can be produced by a method using a catalyst described in, e.g., Japanese Laid-open Patent Application (Kokai) Nos. 121,709/1987, 121,711/1987 and 129,303/1987.

As the catalyst, the following catalysts are used, for example.

(A) a metallocene compound of a transition metal selected from metals of group IVB in the periodic table, and (B) an organoaluminum oxy compound.

The metallocene compound (A) of the transition metal selected from metals of group IVB in the periodic table is represented by the formula (I)

$$ML_x \qquad (I)$$

In the above formula (I), M is a transition metal selected from metals of group IVB in the periodic table, such as zirconium, titanium and hafnium, and x is a valence of the transition metal, and L is a ligand that coordinates the transition metal. At least one ligand L is a ligand having a cyclopentadienyl skeleton, and the ligand having the cyclopentadienyl skeleton may have a substituent.

Examples of the ligand-having the cyclopentadienyl skeleton include a cyclopentadienyl group; alkyl- or cycloalkyl-substituted cyclopentadienyl groups such as methylcyclopentadienyl, ethylcyclopentadienyl, n- or i-propylcyclopentadienyl, n-, i-, sec- or tert-butylcyclopentadienyl, hexylcyclopentadienyl, octylcyclopentadienyl, dimethylcyclopentadienyl, trimethylcyclopentadienyl, tetramethylcyclopentadienyl, pentamethylcyclopentadienyl, methylethylcyclopentadienyl, methylpropylcyclopentadienyl, methylbutylcyclopentadienyl, methylhexylcyclopentadienyl, methylbenzylcyclopentadienyl, ethylbutylcyclopentadienyl, ethylhexylcyclopentadienyl and methylcyclohexylcyclopentadienyl groups; an indenyl group; a 4,5,6,7-tetrahydroindenyl group; and a fluorenyl group.

These groups may be substituted with a halogen atom or a trialkylsilyl group.

Examples of the ligand L other than the ligand having the cyclopentadienyl skeleton include a hydrocarbon group having 1 to 12 carbon atoms, an alkoxy group, an aryloxy group, a sulfonic acid-containing group (—$SO_3R_a$) (wherein Ra is an alkyl group, an alkyl group substituted with a halogen atom, an aryl group, or an aryl group substituted with a halogen atom or an alkyl group), a halogen atom, and a hydrogen atom.

The hydrocarbon group having 1 to 12 carbon atoms includes an alkyl group, a cycloalkyl group, an aryl group and an aralkyl group. Specific examples of such hydrocarbon group include:

alkyl groups such as methyl, ethyl, n-propyl, isopropyl, n-butyl, isobutyl, sec-butyl, tert-butyl, pentyl, hexyl, octyl, decyl and dodecyl groups, cycloalkyl groups such as cyclopentyl and cyclohexyl groups, aryl groups such as phenyl and tolyl groups, aralkyl groups such as benzyl and neophyl groups, alkoxy groups such as methoxy, ethoxy, n-propoxy, isopropoxy, n-butoxy, isobutoxy, sec-butoxy, tert-butoxy, pentoxy, hexoxy and octoxy groups, aryloxy groups such as a phenoxy group, sulfonic acid-containing groups ($-SO_3Ra$) such as methanesulfonate, p-toluenesulfonate, trifluoromethanesulfonate and p-chlorobenzenesulfonate groups, and halogen atoms such as fluorine, chlorine, bromine and iodine.

The metallocene compound of the formula (I) in which the valence of the transition metal is, for example, 4, is represented by the formula (II), more specifically.

$$R^2{}_k R^3{}_l R^4{}_m R^5{}_n M \qquad (II)$$

wherein M is the same transition metal as defined in the formula (I), $R^2$ is a group (ligand) having a cyclopentadienyl skeleton, $R^3$, $R^4$ and $R^5$ are each independently a group having a cyclopentadienyl skeleton or the same as the ligand L other than the ligand having the cyclopentadienyl skeleton in the formula (I), k is an integer of 1 or more, and k+l+m+n=4.

Examples of the metallocene compound with M=zirconium, containing at least two ligands having the cyclopentadienyl skeleton include:

bis(cyclopentadienyl)zirconium monochloride monohydride,
bis(cyclopentadienyl)zirconium dichloride,
bis(cyclopentadienyl)zirconium dibromide,
bis(cyclopentadienyl)methylzirconium monochloride,
bis(cyclopentadienyl)zirconium phenoxymonochloride,
bis(methylcyclopentadienyl)zirconium dichloride,
bis(ethylcyclopentadienyl)zirconium dichloride,
bis(n-propylcyclopentadienyl)zirconium dichloride,
bis(isopropylcyclopentadienyl)zirconium dichloride,
bis(tert-butylcyclopentadienyl)zirconium dichloride,
bis(n-butylcyclopentadienyl)zirconium dichloride,
bis(sec-butylcyclopentadienyl)zirconium dichloride,
bis(isobutylcyclopentadienyl)zirconium dichloride,
bis(hexylcyclopentadienyl)zirconium dichloride,
bis(octylcyclopentadienyl)zirconium dichloride,
bis(indenyl)zirconium dichloride,
bis(4,5,6,7-tetrahydroindenyl)zirconium dichloride,
bis(indenyl)zirconium dibromide,
bis(cyclopentadienyl)zirconium dimethyl
bis(cyclopentadienyl)zirconium methoxychloride,
bis(cyclopentadienyl)zirconium ethoxychloride,
bis(fluorenyl)zirconium dichloride,
bis(cyclopentadienyl)zirconium bis(methanesulfonate),
bis(cyclopentadienyl)zirconium bis(p-toluenesulfonate),
bis(cyclopentadienyl)zirconium bis(trifluoromethanesulfonate),
bis(methylcyclopentadienyl)zirconium bis(trifluoromethanesulfonate),
bis(ethylcyclopentadienyl)zirconium bis(trifluoromethanesulfonate),
bis(propylcyclopentadienyl)zirconium bis(trifluoromethanesulfonate),
bis(butylcyclopentadienyl)zirconium bis(trifluoromethanesulfonate),
bis(hexylcyclopentadienyl)zirconium bis(trifluoromethanesulfonate),
bis(1,3-dimethylcyclopentadienyl)zirconium bis(trifluoromethanesulfonate),
bis(1-methyl-3-ethylcyclopentadienyl)zirconium bis(trifluoromethanesulfonate),
bis(1-methyl-3-propylcyclopentadienyl)zirconium bis(trifluoromethanesulfonate),
bis(1-methyl-3-butylcyclopentadienyl)zirconium bis(trifluoromethanesulfonate),
bis(1,3-dimethylcyclopentadienyl)zirconium dichloride
bis(1-methyl-3-ethylcyclopentadienyl)zirconium dichloride,
bis(1-methyl-3-propylcyclopentadienyl)zirconium dichloride,
bis(1-methyl-3-butylcyclopentadienyl)zirconium dichloride,
bis(1-methyl-3-hexylcyclopentadienyl)zirconium dichloride,
bis(1-methyl-3-octylcyclopentadienyl)zirconium dichloride,
bis(1-ethyl-3-butylcyclopentadienyl)zirconium dichloride,
bis(trimethylcyclopentadienyl)zirconium dichloride,
bis(tetramethylcyclopentadienyl)zirconium dichloride,
bis(pentamethylcyclopentadienyl)zirconium dichloride,
bis(methylbenzylcyclopentadienyl)zirconium dichloride,
bis(ethylhexylcyclopentadienyl)zirconium dichloride, and
bis(methylcyclohexylcyclopentadienyl)zirconium dichloride.

A compound of the formula (II) in which the above 1,3-substituted cyclopentadienyl group is replaced with a 1,2-substituted cyclopentadienyl group can also be used in this invention.

A bridge-type metallocene compound of the formula (II) in which at leas t two of $R^2$, $R^3$, $R^4$ and $R^5$, e.g., $R^2$ and $R^3$ are groups (ligands) having a cyclopentadienyl skeleton which groups are bound via an alkylene group, a substituted alkylene group, a silylene group or a substituted silylene group, can also be used in this invention. On this occasion, $R^4$ and $R^5$ are each independently the same as the ligand L other than the ligand having the cyclopentadienyl skeleton, described in the formula (I).

Examples of such bridge-type metallocene compound include:

ethylenebis(indenyl)dimethylzirconium,
ethylenebis(indenyl)zirconium dichloride,
ethylenebis(indenyl)zirconium bis(trifluoromethanesulfonate),
ethylenebis(indenyl)zirconium bis(methanesulfonate),
ethylenebis(indenyl)zirconium bis(p-toluenesulfonate), and
ethylenebis(indenyl)zirconium bis(p-chlorobenzenesulfonate).

The zirconocene compounds have been thus far mentioned as the metallocene compound (A). However, compounds in which zirconium is replaced with titanium or hafnium can also be used in this invention.

These compounds may be used either singly or in combination. Further, they may be used upon being diluted with hydrocarbons or halogenated hydrocarbons.

In this invention, it is preferred that the metallocene compound (A) is used upon being diluted with hydrocarbons, especially an aliphatic hydrocarbon solvent or an alicyclic hydrocarbon solvent (b) which will be later described.

The metallocene compound (A) can also be used in contact with a particulate carrier compound.

Examples of the carrier compound include inorganic carrier compounds such as $SiO_2$, $Al_2O_3$, $B_2O_3$, MgO, $ZrO_2$, CaO, $TiO_2$, ZnO, $ZnO_2$, $SnO_2$, BaO and ThO; and resins such as polyethylene, polypropylene, poly-1-butene, poly-4-methyl-1-pentene and a styrene-divinylbenzene copolymer. These carrier compounds can be used either singly or in combination.

In this invention, a zirconocene compound having zirconium as a central metallic atom and containing at least two ligands having a cyclopentadienyl skeleton is preferably used as the metallocene compound (A).

Next, the organoaluminum oxy compound (B) used in this invention will be explained.

In this invention, the organoaluminum oxy compound (B) is used as a slurry of an aliphatic hydrocarbon solvent or an alicyclic hydrocarbon solvent (b) as will be later described. First, the organoaluminum oxy compound (B) will be explained.

The organoaluminum oxy compound (B) used in this invention may be either a hitherto known aluminoxane (B-1) or a benzene-insoluble organoaluminum oxy compound (B-2).

The hitherto known aluminoxane (B-1) is represented by the formula (III) or (IV)

$$R_2Al-(OAl)-OAlR_2 \quad \text{(III)}$$
$$\quad\quad\quad | $$
$$\quad\quad\quad R$$

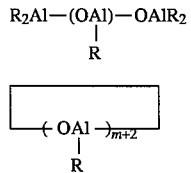
(IV)

wherein R is a hydrocarbon group such as a methyl group, an ethyl group, a propyl group or a butyl group, preferably a methyl group or an ethyl group, especially preferably a methyl group, and m is an integer of 2 or more, preferably an integer of 5 to 40.

The aluminoxane may be formed from a mixed alkyloxyaluminum unit comprising an alkyloxyaluminum unit represented by the formula $(OAl(R^7))$ and an alkyloxyaluminum unit represented by the formula $(OAl(R^8))$ [wherein $R^7$ and $R^8$ are the same hydrocarbons as R and denote different groups].

The hitherto known aluminoxane (B-1) can be produced by, e.g., the following methods and is usually recovered as a solution of an aromatic hydrocarbon solvent.

(1) A method in which an organoaluminum compound such as a trialkylaluminum is added to an aromatic hydrocarbon solvent having dispersed therein a compound containing absorbed water or a salt containing water of crystallization, such as magnesium chloride hydrate, copper sulfate hydrate, aluminum sulfate hydrate, nickel sulfate hydrate or cerous chloride hydrate, and the mixture is allowed to react and then an aluminoxane is recovered as a solution of the aromatic hydrocarbon solvent.

(2) A method in which an organoaluminum compound such as a trialkylaluminum is directly reacted with water (in the form of liquid, ice or water vapor) in a medium such as benzene, toluene, ethyl ether or tetrahydrofuran, and an aluminoxane is recovered as a solution of the medium.

Of these methods, the method (1) is preferred.

Specific examples of the organoaluminum compound used to produce the solution of aluminoxane include:

trialkylaluminums such as trimethylaluminum, triethylaluminum, tripropylaluminum, triisopropylaluminum, tri-n-butylaluminum, triisobutylaluminum, tri-sec-butylaluminum, tri-tertbutylaluminum, tripentylaluminum, trihexylaluminum, trioctylaluminum, tridecylaluminum, tricyclohexylaluminum and tricyclooctylaluminum, dialkylaluminum halides such as dimethylaluminum chloride, diethylaluminum chloride, diethylalminum bromide and diisobutylaluminum chloride, dialkylaluminum hydrides such as diethylaluminum hydride and diisobutylaluminum hydride, dialkylaluminum alkoxides such as dimethylaluminum methoxide and diethylaluminum ethoxide, and dialkylaluminum aryloxides such as diethylaluminum phenoxide.

Of these, the trialkylaluminums are most preferred.

As the organoaluminum compound, isoprenylaluminum represented by the formula [V] can be used.

$$(i\text{-}C_4H_9)_xAl_y(C_5H_{10})_z \quad [V]$$

wherein x, y and z are positive integers, and $z \geq 2x$.

The above organoaluminum compounds are used either singly or in combination.

The benzene-insoluble organoaluminum oxy compound (B-2) used in this invention can be obtained by, for example, a method in which a solution of the aluminoxane is brought into contact with water or an active hydrogen-containing compound, or a method in which the above organoaluminum compound is brought into contact with water.

A ratio of absorbance (D1220) near 1220 cm$^{-1}$ and absorbance (D1260) near 1260 cm$^{-1}$ (D1260/D1220) of the benzene-insoluble organoaluminum oxy compound used in this invention is, when analyzed by infrared spectroscopic analysis (IR), 0.09 or less, preferably 0.08 or less, especially preferably 0.04 to 0.07.

The above benzene-insoluble organoaluminum oxy compound (B-2) is presumed to have an alkyloxyaluminum unit (i) represented by the formula VI.

(VI)

wherein $R^9$ is a hydrocarbon group having 1 to 12 carbon atoms.

Specific examples of the hydrocarbon group include methyl, ethyl, n-propyl, isopropyl, n-butyl, isobutyl, pentyl, hexyl, octyl, decyl, cyclohexyl and cyclooctyl groups. Of these, the methyl and ethyl groups are preferable, and the methyl group is especially preferable.

The benzene-insoluble organoaluminum oxy compound (B-2) may contain, other than the alkyloxyaluminum unit (i) represented by the formula (VI), an oxyaluminum unit (ii) represented by the formula (VII).

 (VII)

wherein $R^{10}$ is a hydrocarbon group having 1 to 12 carbon atoms, an alkoxy group having 1 to 12 carbon atoms, an aryloxy group having 6 to 20 carbon atoms, a hydroxyl group, a halogen or hydrogen.

$R^{10}$ in the formula (VII) and $R^9$ in the formula (VI) are groups different from each other.

When said compound (B-2) contains the oxyaluminum unit (ii), an organoaluminum oxy compound containing the alkyloxyaluminum unit (i) in an amount of at least 30 mol %, preferably at least 50 mol %, especially preferably at least 70 mol % is desirous.

The above organoaluminum oxy compound (B) is usually commercially available as a toluene solution.

The organoaluminum oxy compound (B) used in this invention may contain a small amount of an organic compound component of a metal other than aluminum.

The organoaluminum oxy compound (B) can also be used as being supported on the above carrier compound.

The above catalyst for polymerization is formed from the aforesaid metallocene compound (A) and organoaluminum compound (B), and may further contain, together with these compounds (A) and (B), the organoaluminum compound (C) as required. As the organoaluminum compound (C), an organoaluminum compound represented by the formula (VIII) can be mentioned, for example.

$$R^{11}{}_nAlX_{3-n} \qquad (VIII)$$

wherein $R^{11}$ is a hydrocarbon group having 1 to 12 carbon atoms, X is a halogen or hydrogen atom, and n is an integer of 1 to 3.

The hydrocarbon group having 1 to 12 carbon atoms includes an alkyl group, a cycloalkyl group and an aryl group. Specific examples of the hydrocarbon group include methyl, ethyl, n-propyl, isopropyl, isobutyl, pentyl, hexyl, octyl, cyclopentyl, cyclohexyl, phenyl and tolyl groups.

Specific examples of such organoaluminum compound include:

trialkylaluminums such as trimethylaluminum, triethylaluminum, triisopropylaluminum, triisobutylaluminum, trioctylaluminum and tri-2-ethylhexylaluminum, alkenylaluminums such as isoprenylaluminum, dialkylaluminum halides such as dimethylaluminum chloride, diethylaluminum chloride, diisopropylaluminum chloride, diisobutylaluminum chloride and dimethylaluminum bromide, alkylaluminum sesquihalides such as methylaluminum sesquichloride, ethylaluminum sesquichloride. isopropylaluminum sesquichloride, butylaluminum sesquichloride and ethylaluminum sesquibromide, alkylaluminum dihalides such as methylaluminum dichloride, ethylaluminum dichloride, isopropylaluminum dichloride and ethylaluminum dibromide, and alkylaluminum hydrides such as diethylaluminum hydride and diisobutylaluminum hydride.

As the organoaluminum compound (C), a compound represented by the formula (IX) can also be used.

$$R^{11}{}_nAlY_{3-n} \qquad (IX)$$

wherein $R^{11}$ is the same as defined in the above formula (VIII); Y is $-OR^{12}$, $-OSiR^{13}{}_3$, $-OAlR^{14}{}_2$, $-NR^{15}{}_2$, $-SiR^{16}{}_3$ or $-N(R^{17})AlR^{18}{}_2$ in which $R^{12}$, $R^{13}$, $R^{14}$ and $R^{18}$ are each a methyl, ethyl, isopropyl, isobutyl, cyclohexyl or phenyl group, $R^{15}$ is hydrogen or a methyl, ethyl, isopropyl, phenyl or trimethylsilyl group, and $R^{16}$ and $R^{17}$ are each a methyl or ethyl group; and n is an integer of 1 to 2.

Specific examples of such organoaluminum compound include:

(i) compounds represented by the formula $R^{11}{}_nAl(OR^{12})_{3-n}$, such as dimethylaluminum methoxide, diethylaluminum ethoxide and diisobutylaluminum methoxide, (ii) compounds represented by the formula $R^{11}{}_nAl(OSiR^{13}{}_3)_{3-n}$, such as $Et_2Al(OSiMe_3)$, $(iso-Bu)_2Al(OSiMe_3)$ and $(iso-Bu)_2Al(OSiEt_3)$, (iii) compounds represented by the formula $R^{11}{}_nAl(OAl^{14}{}_2)_{3-n}$, such as $Et_2AlOAlEt_2$ and $(iso-Bu)_2AlOAl(iso-Bu)_2$, (iv) compounds represented by the formula $R^{11}{}_nAl(NR^{15}{}_2)_{3-n}$, such as $Me_2AlNEt_2$, $Et_2AlNHMe$, $Me_2AlNHEt$, $Et_2AlN(SiMe)_2$ and $(iso-Bu)_2AlN(SiMe_3)_2$, (v) compounds represented by the formula $R^{11}{}_nAl(SiR^{16}{}_3)_{3-n}$, such as $(iso-Bu)_2AlSiMe_3$, and (vi) compounds represented by the formula $R^{11}{}_nAl(NAlR^{18}{}_2)_{3-n}$, such as $Et_2AlNAlEt_2$ and

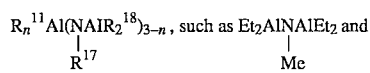

In this invention, among the above organoaluminum compounds (C), the trialkylaluminum is preferable, and triisobutylaluminum is especially preferable. These organoaluminum compounds (C) can be used either singly or in combination.

The catalyst for polymerization used in this invention is formed of the aforesaid catalyst components (A), (B) and optionally (C). At this time, the metallocene compound (A) is used in an amount of usually about 0.00005 to 0.1 mmol, preferably about 0.0001 to 0.05 mmol, calculated as a transition metal atom, per liter of the polymerization volume, and the organoaluminum oxy compound (B) is used such that the amount of the aluminum atom in the organoaluminum oxy compound (B) is usually about 1 to 10,000 mols, preferably 10 to 5,000 mols, per mol of the transition metal atom of the metallocene compound(B). Further, when the organoaluminum compound (C) is used, the amount of said compound (C) is usually about 0 to 200 mols, preferably about 0 to 100 mols, per mol of the aluminum atom of the organoaluminum oxy compound (B).

The molecular weight of the ethylene/α-olefin copolymer rubber can be defined by the Mooney viscosity of the chlorinated ethylene/α-olefin copolymer rubber. An ethylene/α-olefin copolymer rubber before the chlorination which has an intrinsic viscosity [η], measured at 135° C. in decalin, of 0.5 to 6.0 is preferably used. The chlorinated ethylene/α-olefin copolymer rubber is obtained by chlorinating the above obtained ethylene/α-olefin copolymer rubber.

The ethylene/α-olefin copolymer rubber can be chlorinated by, for example, dissolving the copolymer rubber in a solvent and bringing the solution into contact with molecular chlorine in the presence of light or an organic peroxide as a catalyst. In the reaction, a solvent can be used. Examples of the solvent include organic solvents such as carbon tetrachloride, chloroform, cyclohexane, trichloroethane, tetrachloroethylene and nitromethane; and inorganic solvents such as titanium tetrachloride, tin tetrachloride, silicon tetrachloride, vanadium tetrachloride and vanadyl trichloride. From the aspects of stability and safety to chlorine, carbon tetrachloride and chloroform among these solvents are preferred.

After the chlorination reaction, the reaction mixture is usually post-treated as follows. First, the molecular chlorine and hydrogen chloride are removed from the reaction mixture, and then the reaction mixture is charged into a poor solvent for the chlorinated ethylene/α-olefin copolymer rubber, such as methanol. The precipitate is filtered, washed with the poor solvent and dried. Alternatively, the reaction mixture is formed into a thin film, and a solvent is removed with heat. The degree of chlorination can be controlled by changing an amount of the molecular chlorine, a reaction time, a reaction temperature and an amount of the catalyst.

The chlorine content of the chlorinated ethylene/α-olefin copolymer rubber in this invention is 20 to 40% by weight, preferably 25 to 35% by weight. The Mooney viscosity $[ML_{1+4}(121°\ C.)]$ of the chlorinated ethylene/α-olefin copolymer rubber is, from the aspects of moldability, workability and performance, 10 to 190, preferably 20 to 150, more preferably 30 to 120.

In the above requirements, when the chlorine content is less than 20% by weight, effects of an oil resistance, a flame retardance and an adhesion expected by the chlorination are not sufficiently exhibited. When the chlorine content is more than 40% by weight, a melt flowability decreases, and a moldability and a processability become poor.

When the Mooney viscosity $[ML_{1+4}(121°\ C.)]$ is lower than the above range, a strength of the chlorinated ethylene/α-olefin copolymer rubber becomes insufficient. On the other hand, when it is higher than the above range, a melt moldability decreases, a moldability and a processability become poor, and said rubber can hardly be blended uniformly with other rubbers or resins.

The chlorinated ethylene/α-olefin copolymer rubber of this invention can be used in an unvulcanized state as a thermoplastic rubber. The unvulcanized chlorinated ethylene/α-olefin copolymer rubber is rich in flexibility and excellent in melt flowability, so that it can easily be blended with various resins. Accordingly, said rubber can advantageously be used, for example, as an impact resistance improver for a vinyl chloride resin, styrene resins such as polystyrene, an AS resin and an ABS resin and polypropylene, as a non-migratory plasticizer for soft to semi-rigid styrene resins, or as a flame retardant for polyolefins such as polyethylene and polypropylene.

The vulcanized, chlorinated ethylene/α-olefin copolymer rubber (chlorinated ethylene/α-olefin copolymer rubber composition) will be explained below.

The chlorinated ethylene/α-olefin copolymer rubber of this invention most exhibits the properties in the vulcanized state. The vulcanized product can be produced by, in the same manner as an ordinary rubber is vulcanized, first preparing an unvulcanized blended rubber and then forming the blended rubber into an intended shape, followed by vulcanization.

In this invention, the chlorinated ethylene/α-olefin copolymer rubber of this invention can further contain, depending on a processability and other properties required in producing the rubber, additives known per se, such as a vulcanizing agent, a vulcanization aid, a rubber reinforcing agent, a pigment, a filler, a softening agent, a metallic activator, a scorch retarder, a hydrochloric acid absorber, an antioxidant and a processing aid.

The composition of this invention can effectively be vulcanized with triazine or organic peroxides.

In the triazine vulcanization, a triazine compound represented by the formula (X) is used as a vulcanizing agent.

wherein $R^{19}$ is $-NR^{20}R^{21}$, $-OR^{20}$ or $-SR^{20}$ in which $R^{20}$ and $R^{21}$ are each a hydrogen atom, an unsubstituted or substituted alkyl group, or an unsubstituted or substituted aryl group.

Specific examples of the triazinethiol represented by the formula (X) include triazine-2,4,6 -trithiol, 2-dibutylaminotriazine-4,6-dithiol, 2 -phenylaminotriazine-4,6-dithiol, 2-hexylaminotriazine-4,6-dithiol, 2-diethylaminotriazine-4, 6-dithiol and 2 -butoxytriazine-4,6-dithiol.

The amount of the triazine compound can properly be selected as required. It is preferably $5.0\times10^{-4}$ to $5.0\times10^{-2}$ mol, more preferably $1.5\times10^{-3}$ to $2.0\times10^{-2}$ mol, more preferably $3.0\times10^{-3}$ to $1.3\times10^{-2}$ mol per 100 g of the chlorinated ethylene/α-olefin copolymer rubber.

When the amount of the vulcanizing agent is less than the above range, a vulcanized product having a suitable rubber elasticity cannot be obtained. When the amount of the vulcanizing agent is more than the above range, an elongation decreases, and the rubber cannot be put to practical use.

To meet various rubber processes, it is practically quite important to control a rate of vulcanization. To this end, a vulcanization aid is added. The vulcanization aid is added to the rubber composition of this invention as required.

When the triazine compound is used as the vulcanizing agent, a vulcanization aid is added to give a practical rate of vulcanization in processing and molding. As the vulcanization aid, an organic base or a compound capable of forming the organic base which has an acid dissociation constant (pKa) of 7 or more is used.

Examples of the vulcanization aid include 1,8-diazabicyclo(5,4,0)undecene-7, laurylamine, benzylamine, dibenzylamine, N-methylmorpholine, dicyclohexylamine, zinc dibutyldithiocarbamate, pentamethylenedithiocarbamic acid piperidine salt, N-cyclohexyl-2-benzothiazolylsulfeneamide, benzoic acid.piperidine salt, benzoic acid.dicyclohexylamine salt, diphenylguanidine, diorthotolylguanidine, dipentamethylenethiuram tetrasulfide, tetramethylthiuram disulfide, and onium salts such as tetramethylsulfonium iodide, tetramethylammonium chloride, tetrabutylphosphonium bromide, tetrabutylammonium bromide, and distearyldimethylammonium chloride.

The amount of the vulcanization aid is preferably $5\times10^{-4}$ to $2\times10^{-2}$ mol, more preferably $1\times10^{-3}$ to $1\times10^{-2}$ mol per 100 g of the chlorinated ethylene/α-olefin copolymer rubber. These vulcanization aids are used either singly or in combination.

In the organic peroxide vulcanization, examples of the vulcanizing agent include dicumyl peroxide, 2,5-dimethyl-2,5-di(tert-butylperoxy)hexane, 2,5-dimethyl-2,5-di(benzoylperoxy)hexane, 2,5-dimethyl-2,5-di(tert-butylperoxy)hexine-3, di-tert-butyl peroxide, di-tert-butylperoxy-3,3,5-trimethylcyclohexane and di-tert-butyl hydroperoxide. Of these, dicumyl peroxide, di-tert-butyl peroxide and di-tert-butylperoxy-3,3,5-trimethylcyclohexane are preferred.

The amount of the organic peroxide is preferably $3 \times 10^{-3}$ to $5 \times 10^{-2}$ mol, more preferably $1 \times 10^{-3}$ to $3 \times 10^{-2}$ mol per 100 g of the chlorinated ethylene/α-olefin copolymer rubber.

When the organic peroxide is used as the vulcanizing agent, the joint use of the vulcanization aid is preferred. Examples of the vulcanization aid include sulfur; quinone dioximes such as p-quinone dioxime; acrylic esters such as ethylene glycol dimethacrylate and trimethylolpropane trimethacrylate; allyl esters such as diallyl phthalate and triallyl isocyanate; maleimide-based compound; and divinylbenzene.

The amount of the vulcanization aid is preferably 0.5 to 2 mols, more preferably 1 mol, per mol of the organic peroxide used.

As the rubber reinforcing agent, carbon blacks such as SRF, GPF, FEF, MAF, ISAF, SAF, FT and MT, and finely divided silicic acid are properly used.

The amount of the reinforcing agent is preferably 300 parts by weight or less, more preferably 150 parts by weight or less, per 100 parts by weight of the chlorinated ethylene/α-olefin copolymer rubber. When the amount is more than 300 parts by weight, a processability decreases.

Examples of the filler include soft calcium carbonate, heavy calcium carbonate, talc and clay. An inorganic pigment and an organic pigment are used for coloration.

The amount of the filler is properly selected depending on the desired product. It is preferably 300 parts by weight or less, more preferably 150 parts by weight or less, per 100 parts by weight of the chlorinated ethylene/α-olefin copolymer rubber.

As the softening agent, a specific paraffin-type process oil which is a basic requirement in this invention is used. However, an existing softening agent can also be used as required. Examples of such softening agent include fatty oils such as a castor oil, a colza oil, a soybean oil and a coconut oil, a tall oil, waxes such as a beeswax, a carnauba wax and lanolin; aliphatic acids or their metal salts such as ricinoleic acid, palmitic acid, stearic acid, barium stearate and calcium stearate; naphthenic acid or its metallic soap; a pine oil, a rosin or its derivatives; a terpene resin, a petroleum resin, a cumarone-indene resin, atactic polypropylene, dioctyl phthalate, ester-type plasticizers such as dioctyl adipate and dioctyl sebacate, a microcrystalline wax, a factice, liquid polybutadiene, modified liquid polybutadiene and liquid thiocol.

The amount of the softening agent is properly selected depending on the desired product. It is preferably 200 parts by weight or less, more preferably 70 parts by weight or less, per 100 parts by weight of the chlorinated ethylene/α-olefin copolymer rubber. When the amount of the softening agent is more than 200 parts by weight, a resistance to heat aging undesirously decreases.

Examples of the metallic activator include magnesium oxide, higher fatty acid zinc, red lead oxide, litharge, calcium oxide and hydrotalcite.

The amount of the metallic activator is preferably 3 to 15 parts by weight, more preferably 5 to 10 parts by weight, per 100 parts by weight of the chlorinated ethylene/α-olefin copolymer rubber.

As the scorch retarder, a known scorch retarder can be used. Examples of the scorch retarder include maleic anhydride, a thioimide compound, a sulfenamide compound and a sulfonamide compound. The amount of the scorch retarder is preferably 0.2 to 5 parts by weight, more preferably 0.3 to 3 parts by weight, per 100 parts by weight of the chlorinated ethylene/α-olefin copolymer rubber.

As the hydrochloric acid absorber, oxides of metals of group IIA in the periodic table and organic salts are used. Examples of the hydrochloric acid absorber include magnesium stearate, magnesia, calcium stearate, calcium oxide, calcium hydroxide, manasseite, hydrotalcite, epoxidized soybean oil and an epoxy-type hydrochloric acid absorber. The amount of the hydrochloric acid absorber is preferably 10 by weight or less per 100 parts by weight of the chlorinated ethylene/α-olefin copolymer rubber.

The rubber composition of this invention exhibits excellent heat resistance and durability without using an antioxidant. However, If the antioxidant is used, a material life of the product using the rubber composition of this invention can be prolonged as is the case with the ordinary rubber. Examples of the antioxidant used in this case include aromatic secondary amine-based stabilizers such as phenylbutylamine and N,N'-di-2-naphthyl-p-phenylenediamine; phenol-based stabilizers such as dibutylhydroxytoluene and tetrakis[methylene(3,5-ditert-butyl-4-hydroxy)hydrocinnamate]methane; thioether-based stabilizers such as bis[2-methyl-4-(3-n-alkylthiopropionyloxy)-5-tert-butylphenyl] sulfide; and dithiocarbamic acid salt-based stabilizers such as nickel dibutyldithiocarbamate. They may be used either singly or in combination. The amount of the antioxidant is preferably 0.1 to 5 parts by weight, more preferably 0.5 to 3 parts by weight, per 100 parts by weight of the chlorinated ethylene/α-olefin copolymer rubber.

As the processing aid, a processing aid used in the ordinary rubber processing can be used. Examples of the processing aid include ricinoleic acid, stearic acid, parmitic acid, lauric acid, barium stearate, calcium stearate, zinc stearate, esters of said acids, higher fatty acids, and their salts and esters. The amount of the processing aid is preferably up to about 10 by weight, more preferably about 1 to 5 parts by weight, per 100 parts by weight of the chlorinated ethylene/α-olefin copolymer rubber.

The chlorinated ethylene/α-olefin copolymer rubber composition of this invention can be produced by the following method, for example.

The chlorinated ethylene/α-olefin copolymer rubber as the essential component of this invention and the additives such as the reinforcing agent, the filler, the softening agent and the pigment are kneaded at a temperature of about 80° to 170° C. for about 3 to 10 minutes with a mixer such as a Banbury mixer. Then, the vulcanizing agent and the vulcanization aid are additionally mixed with a roll such as an open roll, and the mixture is kneaded at a roll temperature of about 40° to 80° C. for about 3 to 30 minutes, and extruded to form a ribbon-like or sheet-like rubber blend.

The thus formed unvulcanized rubber blend is molded into a desired form with an extruder, a calender roll, a press, an injection molding machine or a transfer molding machine. The molded article is vulcanized by heating usually at about 150° to 270° C. for about 1 to 30 minutes in a vulcanization tank. Or, this vulcanization may be conducted simultaneously in the molding.

As the vulcanization tank, a steam vulcanizer, a hot air vulcanization tank, a glass bead fluidized bed, a molten salt vulcanization tank and a microwave tank are used either singly or in combination.

The vulcanized product is itself useful as electrical insulating materials, automobile engineering parts, industrial rubber products, civil engineering and building materials and rubber coated fabrics.

Examples of the electrical insulating materials are automobile engine caps such as a plug cap, an ignition cap and a distributor cap; a coating insulation layer for a condenser cap, a marine cable and an automobile ignition cable; and cable joint covers.

Examples of the automobile engineering parts are hoses such as a radiator hose and a fuel hose, automobile external parts such as a bumper, a bumper filler, a bumper strip, a bumper side guard, an over-rider, a side protection molding, various weatherstrips, boots, ball joint seals and various antivibration rubbers.

Examples of the industrial rubber parts are rolls, packings, linings and belts.

Examples of the civil engineering and building materials are roofing sheets, heat-resistant belts, building gaskets and highway joint seals.

Examples of the rubber coated fabrics are waterproof fabrics, tents and leisure sheets.

Further, before the vulcanization, one or both of the rubber blends are blended with a foaming agent or a foaming aid as required to give a foamed vulcanized product which can be used in heat insulating materials, cushioning materials, sound deadening materials, etc.

Examples of the foaming agent include inorganic foaming agents such as sodium bicarbonate, ammonium carbonate and ammonium nitrite; nitro compounds such as N,N'-dimethyl-N,N'-dinitrosoterephthalamide, N,N'-dinitrosopentamethylenetetramine; azo compounds such as azodicarbonamide, azobisisobutyronitrile, azocyclohexylnitrile, azodiaminobenzene and barium azodicarboxylate; sulfonylhydrazide compounds such as benzenesulfonyltolylhydrazide, toluenesulfonylhydrazide, p,p'-oxybis(benzenesulfonylhydrazide) and diphenylsulfone-3,3'-disulfonylhydrazide; and azide compounds such as calcium azide, 4,4'-diphenyldisulfonyl azide and p-toluenesulfonyl azide. Of these, the nitro compounds, the azo compounds and the azide compounds are preferred.

The amount of the foaming agent is preferably 0.3 to 30 parts by weight, more preferably 0.5 to 20 parts by weight, per 100 parts by weight of the chlorinated ethylene/α-olefin copolymer rubber. In general, a foamed product having an apparent specific gravity of about 0.03 to 0.9 is formed.

Examples of the foaming aid which can be used along with the foaming agent include organic acids such as salicylic acid, phthalic acid and stearic acid, urea and its derivatives. The foaming aid serves to decrease a decomposition temperature of the foaming agent, promote decomposition and make cells uniform.

In this invention, the chlorinated ethylene/α-olefin copolymer rubber and the chlorinated ethylene/α-olefin copolymer rubber in its composition are, as stated earlier, characterized in that said rubber has the chlorine content of 20 to 40% by weight and has the Mooney viscosity [$ML_{1+4}(121°\ C.)$] of 10 to 190, and that the ethylene/α-olefin copolymer rubber before the chlorination has the vinylidene bond at the terminal of the molecule, the number of the vinylidene bond being 0.05 to 1.00 per 1,000 carbon atoms.

The chlorine content of 20 to 40% by weight gives well-balanced properties in ozone resistance, heat resistance, oil resistance, flame retardance, adhesion and rubber elasticity.

When the chlorine content is lower than the above range, the effects of oil resistance, adhesion and flame retardance which can be expected by the chlorination cannot be fully exhibited. When the chlorine content is higher than the above range, the melt flowability decreases, and the moldability and the processability reduce as is the case with too high a Mooney viscosity.

The Mooney viscosity [$ML_{1+4}(121°\ C.)$] of 10 to 190 gives well-balanced properties, making good the moldability and the processability. When the Mooney viscosity is lower than the above range, the strength of the rubber is not enough. On the other hand, when the Mooney viscosity is higher than the above range, the melt flowability decreases, and the moldability and the processability reduce. Further, the miscibility with other rubbers or resins decreases.

In order to obtain the rubber product having an excellent sealability in this invention, it is quite important that the ethylene/α-olefin copolymer rubber before the chlorination has the vinylidene bond at the terminal of the molecule, the number of said vinylidene bond being 0.05 to 1.00 per 1,000 carbon atoms. That is, when the number of the vinylidene bond at the terminal of the molecule is too small per 1,000 carbon atoms, a product of a high modulus which is intended by this invention cannot be obtained. On the other hand, when said number is too large, the heat stability decreases. The number (per 1,000 carbon atoms) of the vinylidene bond at the terminal of the molecule was found by calculating an absorbance per unit thickness (cm) in the absorption at 890 $cm^{-1}$ based on CH out-of-plane varied-angle vibration with an infrared spectrometer and using a preliminarily prepared calibration curve.

The chlorinated ethylene/α-olefin copolymer rubber of this invention can be effectively vulcanized with the triazine or the organic peroxide. The vulcanized rubber composition can give a rubber product which is excellent in processability and heat stability, good in strength of the vulcanized rubber, high in modulus and excellent in resistance to heat aging and weather resistance by blending 100 parts by weight of the chlorinated ethylene/α-olefin copolymer rubber with up to 300 parts by weight of the reinforcing agent, up to 200 parts by weight of the softening agent and $5.0 \times 10^{-4}$ to $5.0 \times 10^{-2}$ mol per 100 g of said polymerized rubber, of the vulcanizing agent.

Since the chlorinated ethylene/α-olefin copolymer rubber and its composition in this invention show the aforesaid excellent properties, they are useful as the electrical insulating materials, the automobile engineering parts, the industrial rubber products, the civil engineering and building materials, the rubber coated fabrics and the like, as stated above.

This invention is illustrated specifically by referring to the following Examples and Comparative Examples.

EXAMPLE 1

An ethylene/1-butene copolymer rubber was produced by the following method. That is, a 300-liter continuous polymerization reactor was continuously charged with a dehydrated, purified hexane solvent at a ratio of 38.7 liters/hr, a hexane solution of triisobutylaluminum (2.5 mmols/liter) at a ratio of 4 liters/hr, a hexane solution of methylaluminoxane (2.04 milligram atom/liter as an aluminum atom) at a ratio of 6.4 liters/hr, and a hexane solution of bis(1,3-dimethylcyclopentadienyl)zirconium dichloride (0.072 mmol/liter) at a ratio of 0.9 liter/hr (total amount of hexane 50 liters/hr). Simultaneously, ethylene, 1-butene and hydrogen were continuously fed to the polymerization reactor at ratios of 4.2 kg/hr, 15 kg/hr and 0.8 liter/hr respectively, and copolymerization was performed under conditions that a polymerization temperature was 90° C. and a residence time was 1.4 hours.

The solution of the ethylene/1-butene copolymer formed in the polymerization reactor was continuously discharged, and the solvent was separated by evaporation to obtain an ethylene/1-butene copolymer.

The composition of this copolymer rubber was measured with $^{13}C$-NMR, and it was found that the molar ratio of the ethylene unit and the 1-butene unit was 90/10. Then, the number of the vinylidene bond at the terminal of the molecule was measured by IR, and found to be 0.20 per 1,000 carbon atoms. Thereafter, an intrinsic viscosity [η] of the copolymer rubber was measured at 135° C. in decalin, and found to be 1.5.

Three-hundred (300) grams of the copolymer rubber and 1.8 mmols of Perbutyl O, an organic peroxide were dissolved in 5 liters of chloroform, and the solution was charged into an autoclave fitted with a stirrer and a thermometer. While the reaction liquid was kept at 70° C., a chlorine gas was fed to the reactor at a ratio of 2 g/min, and the reaction was performed for 3 hours. A nitrogen gas was then passed through the reactor to remove the chlorine gas and hydrogen chloride remaining in the system. The residue was then concentrated with an evaporator, and further dried at 50° C. for 48 hours under reduced pressure with a vacuum dryer to fully remove the solvent.

The resulting chlorinated ethylene/α-olefin copolymer rubber was measured for properties as follows.

Mooney viscosity $ML_{1+4}$(121° C.)

The Mooney viscosity was measured according to JIS K6300 using a Mooney viscometer MSV-200 Model manufactured by Shimadzu Corporation.

Chlorine content

The chlorine content was measured by a bomb combustion method.

A blend rubber and a vulcanized rubber were then prepared in the following order, and subjected to the tests. First, a blend was prepared with a 8-inch open roll (manufactured by Nippoh Roll K.K.) according to a formulation shown in Table 1. The time for kneading was 15 minutes.

TABLE 1

| Blend | Parts by weight |
|---|---|
| Chlorinated ethylene/α-olefin copolymer rubber | 100.0 |
| Stearic acid | 1.0 |
| Magnesia[1] | 5.0 |
| FEF carbon[2] | 50.0 |
| Naphthene-type process oil[3] | 20.0 |
| ZISNET-DB[4] | 2.0 |
| Benzoic acid.piperidine salt | 3.5 |

[1]KYOWAMAG 150, a trade name for a product of Kyowa Chemical Industry Co., Ltd.
[2]SEAST SO, a trade name for a product of Toyo Carbon K.K.
[3]SUNSEN 4240, a trade name for a product of Japan Sun Oil Co. Ltd
[4]Trade name for dibutylaminotriazine-2,4-dithiol of Sankyo Kasei K.K.

The blend was formed into a sheet having a thickness of 5 mm. The sheet was vulcanized at 160° C. for 20 minutes with a pressing machine (150 t pressing machine for rubber manufactured by Kotaki K.K.) to prepare a 2 mm-thick vulcanized sheet. The vulcanized sheet was measured for a spring hardness (A type) (Hs JISA), a tensile strength, an elongation and a 100% modulus according to JIS K6301.

The results are shown in Table 2.

Comparative Example 1

A mixture of ethylene and 1-butene was polymerized at 50° C. in a hexane solvent in the presence of hydrogen using vanadium oxytrichloride and ethylaluminum sesquichloride as a catalyst to produce an ethylene/1-butene copolymer rubber. The composition of the copolymer rubber was measured by $^{13}$C-NMR, and it was found that a molar ratio of the ethylene unit and the 1-butene unit was 90/10. Then, the number of the vinylidene bond at the terminal of the molecule was measured with IR to show that no vinylidene bond was observed. Thereafter, an intrinsic viscosity [η] of the copolymer rubber was measured at 135° C. in decalin, and found to be 1.6.

Then, the procedure in Example 1 was repeated. The results are shown in Table 2.

EXAMPLE 2

The polymerization was conducted in the same manner as in Example 1 except that the polymerization temperature was 70° C. and the ratio of hydrogen added was 1.2 liters/hr.

Then, the procedure in Example 1 was repeated except using the resulting ethylene/1-butene copolymer rubber in which a molar ratio of the ethylene unit and the 1-butene unit was 90/10, the number of the vinylidene bond at the terminal of the molecule was 0.09 per 1,000 carbon atoms and an intrinsic viscosity [η] measured at 135° C. in decalin was 1.6.

The results are shown in Table 2.

EXAMPLE 3

The polymerization was conducted in the same manner as in Example 1 except that the polymerization temperature was changed to 110° C.

Then, the procedure in Example 1 was repeated except using the resulting ethylene/1-butene copolymer rubber in which a molar ratio of the ethylene unit and the 1-butene unit was 90/10, the number of the vinylidene bond at the terminal of the molecule was 0.45 per 1,000 carbon atoms and an intrinsic viscosity [η] measured at 135° C. in decalin was 1.6.

The results are shown in Table 2.

TABLE 2

|  | Ex. 1 | CEx. 1 | Ex. 2 | Ex. 3 |
|---|---|---|---|---|
| Starting material rubber |  |  |  |  |
| Ethylene/α-olefin (molar ratio) | 90/10 | 90/10 | 90/10 | 90/10 |
| Kind of α-olefin | 1-butene | 1-butene | 1-butene | 1-butene |
| [η] | 1.5 | 1.6 | 1.6 | 1.5 |
| Number of a vinylidene bond at the terminal of the molecule (per 1,000 carbon atoms) | 0.200 | nil | 0.09 | 0.45 |
| Chlorinated ethylene/α-olefin copolymer rubber |  |  |  |  |
| Chlorine content (wt %) | 30 | 30 | 30 | 30 |
| $ML_{1+4}$ (121° C.) | 93 | 91 | 95 | 92 |
| Vulcanized rubber |  |  |  |  |
| Hs (JIS A) | 72 | 71 | 72 | 73 |
| Tb (kg/cm$^2$) | 190 | 180 | 185 | 193 |
| Eb (%) | 390 | 410 | 400 | 400 |
| M100 (kg/cm$^2$) | 50 | 35 | 49 | 51 |

Ex. = Example, CEx. = Comparative Example

EXAMPLE 4

The polymerization was conducted in the same manner as in Example 1 except that a ratio of ethylene was 4.2 kg/hr and a ratio of 1-butene was 10.8 kg/hr.

Then, the procedure in Example 1 was repeated except that the resulting ethylene/1-butene copolymer rubber was used in which a molar ratio of the ethylene unit and the 1-butene unit was 93/7, the number of the vinylidene bond at the terminal of the molecule was 0.21 per 1,000 carbon atoms and an intrinsic viscosity [η] measured at 135° C. in decalin was 1.6, and that a chlorination time was 2.5 hours.

The results are shown in Table 3.

EXAMPLE 5

The polymerization was conducted in the same manner as in Example 1 except that a ratio of ethylene was 4.2 kg/hr and a ratio of 1-butene was 19.1 kg/hr.

Then, the procedure in Example 1 was repeated except that the resulting ethylene/1-butene copolymer rubber was used in which a molar ratio of the ethylene unit and the 1-butene unit was 87/13, the number of the vinylidene bond at the terminal of the molecule was 0.20 per 1,000 carbon atoms and an intrinsic viscosity [η] measured at 135° C. in decalin was 1.6, and that a chlorination time was 3.5 hours.

The results are shown in Table 3.

EXAMPLE 6

The polymerization was repeated in the same manner as in Example 1 except that a ratio of hydrogen to be fed was adjusted to obtain a desired intrinsic viscosity [η]. The procedure in Example 1 was repeated except that the resulting ethylene/1-butene copolymer rubber was used in which a molar ratio of the ethylene unit and the 1-butene unit was 90/10, the number of the vinylidene bond at the terminal of the molecule was 0.23 per 1,000 carbon atoms and an intrinsic viscosity [η] measured at 135° C. in decalin was 2.0, and that a chlorination time was 1.5 hours.

The results are shown in Table 3.

EXAMPLE 7

The polymerization was repeated in the same manner as in Example 1 except that a ratio of 1-hexene was 31.5 kg/hr and a ratio of hydrogen to be fed was adjusted to obtain a desired intrinsic viscosity [η]. The procedure in Example 1 was repeated except using the resulting ethylene/1-hexene copolymer rubber in which a molar ratio of the ethylene unit and the 1-hexene unit was 90/10, the number of the vinylidene bond at the terminal of the molecule was 0.20 per 1,000 carbon atoms and an intrinsic viscosity [η] measured at 135° C. in decalin was 1.5.

The results are shown in Table 3.

TABLE 3

|  | Ex. 4 | Ex. 5 | Ex. 6 | Ex. 7 |
| --- | --- | --- | --- | --- |
| Starting material rubber | | | | |
| Ethylene/α-olefin (molar ratio) | 93/7 | 87/13 | 90/10 | 90/10 |
| Kind of α-olefin | 1-butene | 1-butene | 1-butene | 1-hexene |
| [η] | 1.6 | 1.4 | 2.0 | 1.5 |
| Number of a vinylidene bond at the terminal of the molecule (per 1,000 carbon atoms) | 0.21 | 0.20 | 0.23 | 0.20 |
| Chlorinated ethylene/α-olefin copolymer rubber | | | | |
| Chlorine content (wt %) | 26 | 35 | 20 | 30 |
| $ML_{1+4}$ (121° C.) | 70 | 112 | 98 | 90 |
| Vulcanized rubber | | | | |
| Hs (JIS A) | 72 | 75 | 77 | 74 |
| Tb (kg/cm$^2$) | 179 | 200 | 176 | 192 |
| Eb (%) | 410 | 360 | 480 | 440 |
| M100 (kg/cm$^2$) | 48 | 60 | 52 | 50 |

Ex. = Example

What we claim is:

1. A chlorinated ethylene/α-olefin copolymer rubber: which has a chlorine content of 20 to 40% by weight, which has a Mooney viscosity [$ML_{1+4}$(121° C.)] of 10 to 190, and in which the ethylene/α-olefin copolymer rubber before the chlorination has a vinylidene bond at the terminal of the molecule, the number of said vinylidene bond being 0.05 to 1.00 per 1,000 carbon atoms.

2. The chlorinated ethylene/α-olefin copolymer rubber of claim 1 wherein the composition molar ratio of the ethylene unit and the α-olefin unit of the ethylene/α-olefin copolymer rubber before the chlorination is 85/15 to 95/5.

3. The chlorinated ethylene/α-olefin copolymer rubber of claim 1 wherein the number of carbon atoms of the α-olefin is 3 to 20.

4. A composition comprising 100 parts by weight of the chlorinated ethylene/α-olefin copolymer rubber of claim 1, (a) up to 300 parts by weight of a reinforcing agent, (b) up to 200 parts by weight of a softening agent, and (c) $5.0 \times 10^{-4}$ to $5.0 \times 10^{-2}$ mol, per 100 g of said copolymer rubber, of a vulcanizing agent.

5. A chlorinated ethylene/α-olefin copolymer rubber which is a chlorinated product of an ethylene/α-olefin copolymer rubber having a vinylidene bond at the terminal of the molecule, the number of said vinylidene bond being 0.05 to 1.00 per 1,000 carbon atoms, which has a chlorine content of 20 to 40% by weight, and which has a Mooney viscosity [$ML_{1+4}$(121° C.)] of 10 to 190.

\* \* \* \* \*